United States Patent Office 3,658,750
Patented Apr. 25, 1972

3,658,750
THERMOSETTING RESIN COMPOSITION AND ELECTRICAL APPLIANCES USING THE SAME
Michio Tsukui, Yutaka Watanabe, Hiroshi Suzuki, and Masahiro Kitamura, Hitachi-shi, and Yoshisuke Mori, Shimodate-shi, Japan, assignors to Hitachi, Ltd., and Hitachi Chemical Company, Ltd., both of Tokyo, Japan
Filed Feb. 13, 1969, Ser. No. 798,904
Int. Cl. C08g 51/04
U.S. Cl. 260—38
34 Claims

ABSTRACT OF THE DISCLOSURE

A thermosetting resin composition mainly comprises a thermosetting resin and powdered inorganic filler. The powdered inorganic filler further comprises coarse powder having particle sizes of not less than $100\mu$ and fine powder having particle sizes of not more than $60\mu$ in a mixing ratio by volume of the former to the latter being not more than 1:1.5. The resin composition has a particularly improved flow property and the cured resin composition has a low coefficient of thermal expansion and improved resistances to moisture and heat.

---

This invention relates to a thermosetting resin composition and electrical appliances using the same, and more particularly to a thermosetting resin composition comprising a thermosetting resin and powdered inorganic filler mainly comprising coarse powder having particle sizes of not less than $100\mu$ and fine powder having particle sizes of not more than $60\mu$, and electrical appliances using the same.

Thermosetting resins have been heretofore used in almost all electrical insulation materials, cast products, paints and adhesives. Above all, epoxy resins or unsaturated polyester resins have been heretofore utilized in a considerably wide range on the grounds that said resin has a low volume shrinkage when cured, and the cured product has good electrical characteristics and good resistances to moisture and heat. However, it is well known that said thermo-setting resin has not been utilized alone, but in most cases utilized in a combination with various additives including such inorganic powders as alumina powder, silica powder, quartz powders and calcium carbonate powders, such flexibilizers as dioctyl phthalate, such mold releasing agent as stearic acid and such coloring material as carbon black. The object of mixing the powdered inorganic filler is to improve the physical characteristics of the cured product, that is, electrical characteristics, moisture resistance, heat resistance and thermal conductivity of the cured product. Further, it should be noted that the powdered inorganic filler is mixed for a specific purpose of decreasing a coefficient of thermal expansion of the cured product. Said specific purpose is mainly directed to the electrical insulation materials. More particularly, the most electrical appliance is accompanied with heat evaluation when used, and the insulation materials used in the electrical appliance naturally undergo thermal expansion or thermal shrinkage due to heat cycles. In that case, it is necessary to reduce the thermal expansion and shrinkage, because the coefficient of thermal expansion of a metallic material constituting the electrical appliance is considerably lower than the coefficient of thermal expansion of such insulation materials as thermosetting resin, and a difference between the coefficients of thermal expansion of the metallic material and the insulation material brings about peeling or cracks at joints between the metallic material and the insulation material. In the worst case, electrical elements are damaged and a vital, unfavourable influence is sometimes brought about upon the electrical appliance. From this point of view, the powdered inorganic powder takes an important role in the resin composition.

The coefficient of thermal expansion of a cured product depends upon a mixing ratio of the powdered inorganic filler. When the mixing ratio of the powdered inorganic filler is increased, the coefficient of thermal expansion becomes smaller. Accordingly, by mixing a considerably large amount of the powdered inorganic filler, the coefficient of thermal expansion can be decreased to a fairly satisfactory value. However, there is a problem in decreasing the coefficient of thermal expansion of a cured product. That is, when a mixing ratio of the powdered inorganic filler is increased higher and higher to reduce the coefficient of thermal expansion, the flow property of thermosetting resin composition gradually becomes worse at the ordinary temperature. That is, the viscosity of the resin composition is increased, and the casting operation and pressure molding operation become difficult. Accordingly, it is practically impossible to increase the mixing ratio of the powdered inorganic filler to an extremity. Thus, the practically possible mixing ratio of the powdered inorganic filler is limited to 40 to 50% by volume as a maximum, and the mixing ratio of less than 40 to 50% by volume of the powdered inorganic filler is usually employed. The coefficient of linear thermal expansion of a cured product containing less than 40 to 50% by volume of the powdered inorganic filler is almost in a range of 3.0 to $3.5 \times 10^{-5}/°$C., though it depends upon the kind of the powdered inorganic filler used. The coefficient of linear thermal expansion in said range is still higher than that of copper, i.e., $1.7 \times 10^{-5}/°$C. or that of aluminum, i.e. $2.4 \times 10^{-5}/°$C., and is not satisfactory as that required for the insulation materials of electrical appliance using such metallic material.

It has been heretofore desirable from this point of view to develop a thermosetting resin composition having an improved flow property which is capable of forming a cured product having improved physical characteristics.

An object of the present invention is to provide a thermosetting resin composition having a good flow property at about room temperature, which is capable of forming a cured product having good electrical characteristics, moisture resistance, heat resistance and thermal conductivity and a considerably low coefficient of thermal expansion.

Other object of the present invention is to provide a liquid thermosetting resin composition useful for casting.

Another object of the present invention is to provide a liquid thermosetting resin composition useful for lamination, painting, adhesive and impregnating agent.

Further object of the present invention is to provide a solid thermosetting resin composition curable under a relatively low molding pressure.

Still further object of the present invention is to provide a liquid or powdered thermosetting resin composition particularly useful for electrical insulation material.

Still further object of the present invention is to provide a liquid or powdered thermosetting resin composition useful as a molding resin for a electrical appliance to be subjected to heat cycles.

Still further object of the present invention is to provide a liquid or powdered thermosetting resin composition useful as a molding resin for a semi-conductor devices, electronic circuit devices and sheath heaters.

Still further object of the present invention will be readily understood from the following explanation, taken in conjunction with the accompanying drawings.

The gist of the present invention resides in a thermosetting resin composition comprising a thermosetting resin and powdered inorganic filler consisting of one part by volume of the coarse powder having particle sizes of not less than $100\mu$ and not more than 1.5 part by volume of fine powder having particle sizes of not more than 60μ.

Figure 1:
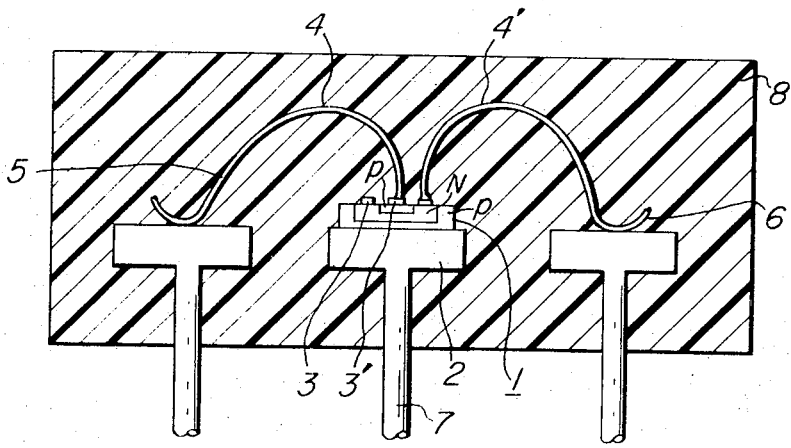
FIG. 1 is a cross-sectional view of a resin-molded semiconductor device.

As is clear from the foregoing explanation, the mixing ratio of powdered inorganic filler must be enhanced as high as possible, so as to achieve the objects and features of the present invention, while the flow property of the desired thermosetting resin composition must not be made worse, however.

The present inventors have found the following facts as a result of various studies on the powdered inorganic filler for the purpose of increasing the mixing ratio of the powdered inorganic filler without making worse the flow property of the thermosetting resin composition. That is, the present inventors have found critical ranges of particle size distribution of the powdered inorganic filler for the thermosetting resin composition and the cured product. The particle size distribution of the powdered inorganic filler usually used is a normal distribution, but the present inventors have found that the powdered inorganic filler having a particle size distribution quite different from the normal distribution can give a good result to the flow property of a thermosetting resin composition and physical properties of a cured product. That is, the powdered inorganic filler mainly comprising one part by volume of coarse powder having particle sizes of not less than 100μ and not more than 1.5 part by volume of fine powders having particle sizes of not more than 60μ is mixed with a thermo-setting resin. Accordingly, the use of the powdered inorganic filler having particle sizes of 60 to 100μ is undesirable. It is confirmed that the use of more than 1.5 parts by volume of fine powdered inorganic filler having particle sizes of not more than 60μ per one part by volume of coarse powdered inorganic filler having particle sizes of not less than 100μ gives an unsatisfactory result to the flow property of the desired thermo-setting resin composition. Use of less than one part by volume of the fine powder is particularly effective. Particularly effective range of particle sizes is 150 to 500μ for the coarse powder, and not more than 45μ for the fine powder.

Further, the present inventors have made studies of properties and shapes of the powdered inorganic filler. The result of the studies reveals that a powdered inorganic filler having a small surface area can much more improve the flow property of the thermosetting resin composition. For example, in the case of a liquid thermo-setting resin composition, the flow property is greatly improved at about room temperature. On the other hand, in the case of a powdered thermosetting resin composition, it is remarkable that the flow property is greatly improved when melted. Further, the good result can be obtained when the pwodered inorganic filler having smooth surfaces and globular shapes is used. The surface smoothness or globular shape is desirable for most of the coarse powder having particle sizes of not less than 100μ.

The mixing ratio of the powdered inorganic filler to the thermosetting resin is not particularly limited, but is most desirable 40 to 95% by volume. A good flow property can be obtained at a mixing ratio of not more than 40% by volume, but a cured product having good physical properties, particularly sufficiently low coefficient of thermal expansion can be hardly obtained. On the other hand, when the mixing ratio exceeds 95% by volume, the coefficient of thermal expansion of a cured product can be considerably lowered, but the flow property of the desired thermosetting resin composition, particularly the flow property of a liquid thermosetting resin composition at about room temperature tends to become considerably worse.

According to investigations of the present inventors, it has been found that the coefficient of thermal expansion of a cured product can be lowered by taking into account the following points. The lowering of the coefficient of thermal expansion can be attained by selecting a powdered inorganic filler having a coefficient of thermal expansion having not more than $1.5 \times 10^{-5}/°$ C. per se.

The powdered inorganic fillers used in the present invention include, for example, alumina powder, silica powder, magnesia powder, zirconia powder, calcium oxide powder, zirconium silicate powder, calcium silicate powder, beryllium aluminum silicate powder, magnesium silicate powder, aluminum silicate powder, lithium aluminum silicate powder, ilmenite powder, barium sulfate powder, calcium sulfate powder, calcium carbonate powder, barium carbonate powder, cobalt sulfide powder, cadmium sulfide powder, cuprous sulfide powder and cupric sulfide powder. These powders can be used singly or in combination in the present invention, but zirconium silicate and ilmenite powders are most useful among others, especially in the case of the liquid resin composition, because of their low cost, very low coefficient of thermal expansion and globular shape. From the viewpoint of the lowest coefficient of linear thermal expansion, amorphous silica powder and beryllium aluminum silicate powder are also useful. Said beryllium aluminum silicate powder can bring about a good result, when applied to a heat-releasable electrical appliance, because of its higher thermal conductivity. On the same ground of higher thermal conductivity, α-alumina powder is also useful.

As stated above, a liquid or powdered thermo-setting resin composition having a good flow property at about room temperature or when melted, which is capable of forming a cured product having a good heat resistance, good moisture resistance, good thermal conductivity and considerably low coefficient of thermal expansion, can be obtained by properly selecting the specific particle size distribution, properties, shape, mixing ratio, coefficient of linear thermal expansion or kind of the powdered inorganic filler to be mixed with a thermo-setting resin.

As a result of the studies on improving of flow property of the thermosetting resin composition, the present inventors have clarified the following fact. That is, by using lead oxide powder simultaneously, prevention of powdered inorganic filler from precipitation can be attained with improving the flow property of the desired thermosetting resin composition at about room temperature or when melted, and curing of the relevant resin can be accelerated by reaction of lead oxide with organic polar groups of the thermosetting resin, for example, epoxy group, hydroxyl group, carboxyl group, or amino group. Further, the moisture and heat resistances of a cured product can be much more improved thereby. The lead oxide powder can bring about said good results when the particle sizes of the powder is less than 50μ and the mixing ratio is 1 to 30% by volume per resin composition. The lead oxide powder having particle sizes of more than 50μ requires a special method and apparatus for preparing the same. Even if more than 30% by volume of the lead oxide powder is added to the composition, much better effect cannot be expected. Accordingly, the use of lead oxide powder having particle sizes of more than 50μ at a mixing ratio of more than 30% by volume makes the composition only economically disadvantageous. On the other hand, any effect cannot be expected when the lead oxide powder is added to the composition at a mixing ratio of less than 1% by volume. The lead oxide powder used in the present invention include, for example, lead oxide powder, lead dioxide powder, lead tetroxide powder, lead suboxide powder, lead sesquioxide powder, and a mixture thereof.

The present invention can be applied to almost all the thermosetting resins, for example, epoxy resin, unsaturated polyester resin, phenol resin, melamine resin, urea resin and silicone resin. Particularly thermosetting resins that can be used as a solventless type resin, such as epoxy resin and unsaturated polyester resin, are advantageous.

In the present invention, curing agents, curing accelerators, flexibilizers, flame retardants, releasing agents, antioxidants, antistatic agents or pigments can be used simultaneously, if required. Other additives for the respective purposes can be used in the present invention.

The thermosetting resin composition of the present invention can be utilized in a very wide range as electrical materials, cast products, pressure molding product, laminated material, paint, adhesive or impregnating materials. The present composition may be effectively used as molding or casting material for electrical appliances in isolating the electric component from the atmospheric influences, as shown in FIG. 1 and FIG. 2.

FIG. 1 is a cross-sectional view of a semi-conductor device, wherein numeral 1 is a semi-conductor body, 2 an electrode, 3 and 3' aluminum films, 4 and 4' golden fine wires, 5 an emitter lead (gold), 6 a base lead (gold), 7 a collector lead, and 8 a cured molding resin material resulting from the resin composition of the present invention. When the thermosetting resin composition of the present invetnion is used and cured as molding resin 8, a cured product having a low coefficient of thermal expansion and good heat and moisture resistances and good thermal conductivity can be obtained, and consequently a good result can be given to the electrical characteristics and life of the semi-conductor device. Particularly, as the coefficient of thermal expansion of a cured product is almost as low as that of the metallic material, wire breakage or damage of element due to the heat cycles is considerably reduced.

Figure 2:
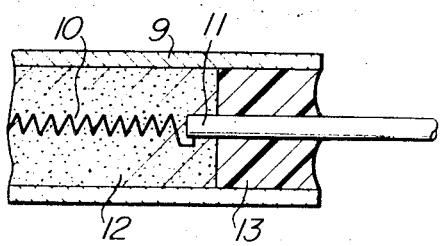
FIG. 2 is a cross-sectional view of terminal view of terminal structure of a sheath heater.

FIG. 2 is a cross-sectional view of partial structure of a sheath heater, wherein numeral 9 is a heater guard pipe, 10 a heater wire, 11 a terminal, 12 a packed layer of inorganic powders for electrical insulation, 13 a cured molding resin material resulting from the resin composition of the present invention. It is known that the sheath heater is an electrical appliance where heat cycles take place particularly vigorously, and the electrical insulation and sealing of the terminal has been heretofore regarded very difficult. The thermosetting resin composition of the present invention can bring about no troubles at all as regards the coefficient of thermal expansion, heat and moisture resistances and thermal conductivity. The life of said sheath heater is not only considerably improved, but the reliability thereof is also highly ensured. The thermosetting resin composition of the present invention is particularly useful as insulation molding resins for electronic circuit devices, for example, an integrated circuit, micromodule, coils of rotor of the ordinary motor, coils of a transformer or the ordinary heating element, electrical insulation paints; impregnating varnishes for laminated articles such as laminated sheets or pipes; and adhesives for component parts of an electrical appliance.

The present invention will be hereunder more concretely explained, referring to examples. The percentage showing mixing ratios are by volume throughout examples.

EXAMPLE 1

(a) Epikote 828 (Bisphenol A type epoxy resin produced by Shell Oil Company)—100 g.
(b) Dipentene dioxide—30 g.
(c) Curing agent "Z" (a curing agent produced by Shell Oil Company)—25 g.
(d) Silica powder (not more than $10\mu$)—4% (30 g.)
(e) Silica powder (not less than $70\mu$)—59% (550 g.)

By mixing said component materials (a) to (e) uniformly, the desired liquid epoxy resin composition was obtained. The thus obtained composition had a good flow property and became readily flowable by applying vibration thereto. A very good castability was attained. The composition was heated and cured at 80° C. for 10 hours, and the characteristics of the thus cured product are given in Table 1.

EXAMPLE 2

(a) DER 332 (a bisphenol A-type epoxy resin produced by Dow Chemical Company)—100 g.
(b) Methyltetrahydrophthalic anhydride (Me-THPA)—30 g.
(c) Benzyldimethylamine (DMBA)—3 g.
(d) Polypropylene glycol—5 g.
(e) Alumina powder (not more than $40\mu$)—19% (400 g.)
(f) Aluminum silicate powder (not less than $150\mu$)—51% (850 g.)

By mixing said component materials (a) to (f) uniformly the desired liquid epoxy resin composition was obtained. The thus obtained composition was heated and cured at 80° C. for 5 hours, 150° C. for 5 hours, and 180° C. for 5 hours. The characteristics of the thus cured product are shown in Table 1.

EXAMPLE 3

(a) Vinylcyclohexene dioxide—50 g.
(b) Diglycidyl ether of bisphenol A (DER 332)—50 g.
(c) Methyl - endo - methylenetetrahydrophthalic anhydride (hereinafter referred to as MHAC which is a trade name of Hitachi Chemical Company—120 g.
(d) 2,4,6-tris (dimethylaminomethyl) phenol (DMP-30)—1 g.
(e) Amorphous silica powder (not more than $50\mu$)—16% (150 g.)
(f) Amorphous silica powder ($110$–$600\mu$)—35% 350 g.)

The components (a) to (f) were uniformly mixed together, whereby the desired liquid epoxy resin composition suitable for the casting purpose was obtained. The thus obtained composition was cured at 120° C. for 2 hours and 150° C. for 19 hours, and the characteristics of thus obtained cured product are given in Table 1.

EXAMPLE 4

(a) Vinylcyclohexene dioxide—100 g.
(b) Methyltetrahydrophthalic anhydride—100 g.
(c) 2-Ethyl-4-methylamidazole—3 g.
(d) Amorphous silica powder (not more than $44\mu$)—18% (210 g.)
(e) Amorphous silica powder ($200$–$800\mu$)—42% (480 g.)

The components (a) to (e) were uniformly mixed together, whereby the desired liquid epoxy resin composition was obtained. The thus obtained resin composition was cured under the same conditions as in Example 3. The characteristics of a cured product are given in Table 1.

EXAMPLE 5

(a) DEN–438 (an epoxy resin produced by Dow Chemical Company)—100 g.
(b) Vinylcyclohexene dioxide—50 g.
(c) Hexahydrophthalic anhydride (HHPA)—25 g.
(d) Methyl-endo-methylenetetrahydrophthalic anhydride—75 g.
(e) DMP–30—3 g.
(f) Barium sulfate powder (not more than $40\mu$)—15% (320 g.)
(g) Lithium aluminum silicate powder (not less than $100\mu$—40% (450 g.)

The components (a) to (g) were uniformly mixed together, whereby the desired liquid epoxy resin composition was obtained. The thus obtained composition was heated and cured at 100° C. for 3 hours, at 150° C. for 5 hours and 180° C. for 5 hours. The characteristics of the thus obtained cured product are given in Table 1.

EXAMPLE 6

(a) Epikote 828 (a bisphenol A type epoxy resin produced by Shell Oil Company)—100 g.

(b) Vinylcyclohexene dioxide—30 g.
(c) Curing agent "Z" (an amine curing agent produced by Shell Oil Company)—25 g.
(d) Lead dioxide powder (1–10μ)—3% (100 g.)
(e) Silica powder (not more than 5μ)—4% (30 g.)
(f) Silica powder (not less than 70μ)—55% (500 g.)

The components (a to (f) were uniformly mixed together, whereby the desired liquid epoxy resin composition was obtained. The thus obtained composition was heated and cured at 80° C. for 10 hours. The characteristics of the thus obtained cured product are give in Table 1.

EXAMPLE 7

(a) ECN–1299 (an epoxycresol novolac produced by Ciba Company)—100 g.
(b) 4,4′-diaminodiphenylmethane—22 g.
(c) Catechol—5 g.
(d) Calcium stearate—3 g.
(e) Lead dioxide powder (1–10μ)—4% (100 g.)
(f) Aluminum silicate powder (not more than 40μ)—18% (160 g.)
(g) Aluminum silicate powder (80–200μ)—40% (370 g.)

The components (a) to (g) were employed. First of all, the components (a) to (d) were pulverized to particle sizes of less than 10 mesh, and the components (e) to (g) were added to the pulverized components (a) to (d). Then, the mixture was uniformly mixed whereby the desired epoxy resin composition was obtained. The thus obtained composition was once pressed under a pressure of 0.5 to 1.5 tons/cm.$^2$ and then crushed. The thus obtained powders was transfer-molded at 150° C. under a pressure of 10 to 100 kg./cm.$^2$ for 2 minutes, and further heated and after-cured at 150° C. for 3 hours.

The characteristics of the thus obtained cured product are given in Table 1.

EXAMPLE 8

(a) Diglycidylether of bisphenol A—50 g.
(b) Vinylcyclohexene dioxide—80 g.
(c) Methyltetrahydrophthalic anhydride—110 g.
(d) 2-ethyl-4-methylimidazole—2 g.
(e) Lead dioxide powder (not more than 20μ)—1.5% (50 g.)
(f) Globular amorphous silica powder prepared in the same as in the following next procedure (not more than 60μ)—14% (130 g.)
(g) Globular amorphous silica powder prepared by heating natural, crystalline α-silica sands to a temperature near the melting point (1700° C.) and quenching the same (150–800μ)—34% (340 g.)

The components (a) to (g) were uniformly mixed together, whereby the desired liquid epoxy resin composition suitable for casting purpose was obtained. The thus obtained composition was cured at 120° C. for 2 hours and 150° C. for 19 hours. The characteristics of the thus obtained cured product are given in Table 1.

EXAMPLE 9

(a) Vinylcyclohexene dioxide—100 g.
(b) MHAC—100 g.
(c) 2-ethyl-4-methylimidazole— 3 g.
(d) Trilead tetroxide powder (not more than 20μ) 5% (200 g.)
(e) Globular amorphous silica powder prepared in the same manner as in Example 8 (not more than 40μ)—17% (210 g.)
(f) Globular amorphous silica powder prepared in the same manner as in Example 8 (200–850μ)—40% (480 g.)

The components (a) to (f) were uniformly mixed together, whereby the desired liquid epoxy resin composition was obtained. The thus obtained composition was cured under the same conditions as in Example 8. The characteristics of the thus obtained cured product are given in Table 1.

EXAMPLE 10

(a) Vinylcyclohexene dioxide—100 g.
(b) 2-ethyl-4-methylimidazole—5 g.
(c) Lead monoxide powder (not more than 20μ)—3.5% (100 g.)
(d) Globular amorphous silica powder prepared in the same manner as in Example 8 (not more than 60μ)—21% (170 g.)
(e) Globular amorphous silica powder prepared in the same manner as in Example 8 (400–800μ)—48% (390 g.)

The components (a) to (e) were uniformly mixed together, whereby the desired liquid epoxy resin composition was obtained. The thus obtained composition was cured under the same conditions as in Example 8. The characteristics of the thus obtained cured product are given in Table 1.

EXAMPLE 11

(a) Epoxynovolac (DEN 44 produced by the Dow Chemical Company)—100 g.
(b) 4,4′-diaminodiphenylmethane—22 g.
(c) Catechol—5 g.
(d) Stearic acid—2 g.
(e) Carbon black—1 g.
(f) Lead dioxide powder (not more than 20μ)—3% (70 g.)
(g) Globular amorphous silica powder prepared in the same manner as in Example 8 (not more than 40μ)—16% (110 g.)
(h) Globular amorphous silica powder prepared in the same manner as in Example 8 (80–300μ—37% (250 g.)

The components (a) to (h) were employed. First of all, the components (a) and (c) to (h) were kneaded in a mixing roll at 50° to 60° C. for 15 minutes, cooled and pulverized to particle sizes of less than 500μ. The thus obtained powder was uniformly mixed with the component (b), and the mixture was once pressed under a pressure of 1500 kg./cm.$^2$ and then crushed to particle sizes of less than 5000μ, whereby the desired powdered epoxy resin composition suitable for the purpose of transfer molding was obtained. The thus obtained composition was cured at 170° C. to 180° C. for 2 to 3 minutes and 200° C. for 3 hours. The characteristics of the thus obtained cured product are given in Table 1.

EXAMPLE 12

(a) Phenol resin (molar ratio of formaldehyde to phenol: 0.9)—100 g.
(b) Hexamethylenetetramine—12.5 g.
(c) Globular amorphous silica powder prepared in the same manner as in Example 8 (not more than 60μ)—18% (120 g.)
(d) Globular amorphous silica powder prepared in the same manner as in Example 3 (100 to 700μ)—43% (275 g.)
(e) Stearic acid—2 g.
(f) Magnesium oxide—2 g.
(g) Lead dioxide powders (not more than 30μ)—4% (93 g.)

The components (a) to (g) were uniformly mixed together, then kneaded in a mixing roll at 80° to 90° C. for 15 to 20 minutes, cooled and then crushed to particle sizes of less than 6000μ, whereby the desired powdered phenol resin composition was obtained. Then, the composition was molded under a low molding pressure such as 60 to 70 kg./cm.$^2$ at 150° to 160° C. for 2 to 3 minutes, and cured. The characteristics of the thus obtained cured product are given in Table 1.

EXAMPLE 13

(a) Propylene glycol—1.1 moles
(b) Isophthalic acid—0.3 mole
(c) Maleic anhydride—0.7 mole Unsaturated polyester resin (viscosity: 7 poises, 30° C.) was prepared by adding 35 g. of styrene to 65 g. of unsaturated polyester synthesized from said components (a) to (c).

(d) The thus prepared unsaturated polyester resin—100 g.
(e) Benzoyl peroxide—0.5 g.
(f) Globular amorphous silica powder prepared in the same maner as in Example 2 (not more than 60μ)—18% (100 g.)
(g) Globular amorphous silica powder prepared in the same manner as in Example 8 (100–700μ)—42% (236 g.)
(h) Lead tetroxide powder (not more than 30μ)—5% (103 g.)

The components (d) and (h) were uniformly mixed together, whereby the desired liquid unsaturated polyester resin composition was obtained. The thus obtained composition was cured at 80° C. for 2 hours and at 150° C. for 5 hours, and the characteristics of the thus obtained cured product are given in Table 1.

EXAMPLE 14

(a) DER–332—100 g.
(b) MHAC—90 g.
(c) DMP–30—3 g.
(d) Beryllium aluminum silicate powder (not more than 30μ)—22% (250 g.)
(e) Beryllium oxide powder (150–600μ)—40% (500 g.)

The components (a) to (e) were uniformly mixed together, whereby the desired liquid epoxy resin composition was obtained. The thus obtained composition was heated and cured at 100° C. for 3 hours, 150° C. for 5 hours and 180° C. for 5 hours, and the characteristics of the thus obtained cured product are given in Table 1.

EXAMPLE 15

(a) Dipentene dioxide—100 g.
(b) Epoxynovolac (DEN–438 produced by the Dow Chemical Company)—50 g.
(c) Hexahydrophthalic anhydride—30 g.
(d) MHAC—90 g.
(e) DMP–30—1 g.
(f) Globular ilmenite powder (not more than 40μ)—16% (400 g.)
(g) Globular ilmenite powder (100–500μ) — 40% (1000 g.)

The components (a) to (g) were uniformly mixed together, whereby the desired liquid epoxy resin composition was obtained. The thus obtained composition was cured at 120° C. for 2 hours and 160° C. for 10 hours, and the characteristics of the thus obtained cured product are given in Table 1.

EXAMPLE 16

(a) Vinlylcyclohexene dioxide—100 g.
(b) Hexahydrophthalic anhydride—100 g.
(c) Benzyldimethylamine—5 g.
(d) Tubular alumina powder (not more than 40μ)—20% (500 g.)
(e) Globular zirconium silicate powder (100–700μ)—52% (1500 g.)

The components (a) to (e) were uniformly mixed together, whereby the desired liquid epoxy resin composition was obtained. The thus obtained composition had a viscosity of 190 poises and a good flow property, and was cured at 80° C. for 3 hours and 160° C. for 10 hours. The characteristics of the thus obtained cured product are given in Table 1.

EXAMPLE 17

(a) Vinylcyclohexene dioxide—100 g.
(b) Methyltetrahydrophthalic anhydride—100 g.
(c) 2-ethyl-4-methylimidazole—3 g.
(d) Globular zirconium silicate powder (not more than 60μ)—25% (1000 g.)
(e) Globular zirconium silicate powder (150–500μ)—55% (2200 g.)

The components (a) to (e) were uniformly mixed together, whereby the desired liquid epoxy resin composition was obtained. The thus obtained composition was cured under the same conditions as in Example 16, and the characteristics of the thus obtained cured product are given in Table 1.

EXAMPLE 18

(a) Vinylcyclohexene dioxide—100 g.
(b) 2-ethyl-4-methylimidazole—5 g.
(c) Globular amorphous silica powder prepared in the same manner as in Example 8—21% (170 g.)
(d) Globular amorphous silica powder prepared in the same manner as in Example 8 (300–800μ) — 49% (390 g.)

The components (a) to (d) were uniformly mixed together, whereby the desired liquid epoxy resin composition was obtained. The thus obtained composition was cured at 80° C. for 5 hours and 150° C. for 17 hours, and the characteristics of the thus obtained cured product are given in Table 1.

EXAMPLE 19

(a) Phenol - formaldehyde-novolac type epoxy resin—100 g.
(b) 4,4′-diaminodiphenylmethane—22 g.
(c) Catechol—5 g.
(d) Stearic acid—2 g.
(e) Carbon black—0.8 g.
(f) Globular amorphous silica powder prepared in the same manner as in Example 8 (not more than 50μ)—17% (110 g.)
(g) Globular amorphous silica powder prepared in the same manner as in Example 8 (100–300μ) — 38% (250 g.)

The components (a) to (g) were employed. First of all, the components (a) and (c) to (g) were kneaded in a mixing roll at 50 to 60° C. for 15 minutes, then cooled and crushed to particle sizes of less than 400μ. Then, the component (b) was added to the crushed powdery mixture and mixed thoroughly together. The thus obtained mixture was once pressed under a pressure of 1500 kg./cm.² and then crushed to particle sizes of less than 5000μ, whereby the desired powdered epoxy resin composition was obtained. The viscosity of the thus obtained composition when melted (150° C.) was 130 poises. Powdered composition was molded at 150° C. under such a low molding pressure as 20–40 kg./cm.² according to the transfer molding, cured and then heated to 150° C. for 5 hours and after-cured. The characteristics of the thus obtained cured product are given in Table 1.

EXAMPLE 20

(a) Phenylmethylsiloxane resin—200 g.
(b) Globular amorphous silica powder prepared in the same manner as in Example 8 (not more than 70μ)—18% (200 g.)
(c) Globular amorphous silica powder prepared in the same manner as in Example 8 (200–600μ) — 41% (460 g.)
(d) Calcium stearate—2 g.
(e) Ammonium stearate—2 g.

The components (a) to (e) were thoroughly mixed together, and kneaded for 5 minutes in a mixing roll, whose one end was kept to 80° to 90° C. and whose other end was kept to 5° C. Then, the mixtures were crushed to particle sizes of less than 6000μ after cooling, whereby the desired powdered silicone resin composition was obtained. The viscosity of the thus obtained composition when melted (180° C.) was 200 poises. The composition was transfer-molded at 170°–180° C. under such a low molding pressure as 40 to 60 kg./cm.$^2$, cured and then heated to 200° C. for 3 hours and after-cured. The characteristics of the thus obtained cured product are given in Table 1.

EXAMPLE 21

(a) Propylene glycol—1.1 moles
(b) Isophthalic acid—0.3 mole
(c) Phthalic anhydride—0.7 mole Unsaturated polyester resin (viscosity: 7 poises, 30° C.) was prepared by adding 35 g. of styrene to 65 g. of the unsaturated polyester synthesized from said components (a) to (c).

(d) The thus prepared unsaturated polyester resin—100 g.
(e) Benzoyl peroxide—0.5 g.
(f) Globular amorphous silica powder prepared in the same manner as in Example 8 (not more than 60μ)—18% (100 g.)
(g) Globular amorphous silica powder prepared in the same manner as in Example 8 (100–700μ)—42% (236 g.)

The components (d) to (g) were thoroughly mixed together, whereby the desired liquid unsaturated polyester resin composition was obtained. The thus obtained composition was cured at 80° C. for 2 hours and 150° C. for 5 hours. The characteristics of the thus obtained cured product are given in Table 1.

EXAMPLE 22

(a) Phenol resin (molar ratio of formaldehyde to phenol: 0.9)—100 g.
(b) Hexamethylenetetramine—12.5 g.
(c) Globular amorphous silica powder prepared in the same manner as in Example 8 (not more than 60μ)—18% (120 g.)
(d) Globular amorphous silica powder prepared in the same manner as in Example 8 (100–700μ)—43% (275 g.)
(e) Stearic acid—2 g.
(f) Magnesium oxide—2 g.

The components (a) to (f) were thoroughly mixed together, then kneaded in a mixing roll at 80° to 90° C. for 15 to 20 minutes, cooled and crushed to particle sizes of less than 6000μ, whereby the desired powdered phenol resin composition was obtained. The thus obtained composition was molded at 150° to 160° C. under such a low molding pressure as 60 to 70 kg./cm.$^2$ for 2 to 3 minutes, and cured. The characteristics of the thus obtained cured product are give in Table 1.

EXAMPLE 23

(a) Propylene glycol—1.1 moles
(b) Isophthalic acid—0.3 mole
(c) Maleic anhydride—0.7 mole Unsaturated polyester resin was prepared by adding 40 g. of styrene to 60 g. of unsaturated polyester synthesized from said components (a) to (c).

(d) The thus prepared unsaturated polyester resin—100 g.
(e) Benzoyl peroxide—0.5 g.
(f) Irregularly-shaped zirconium silicate powder (not more than 50μ)—21% (270 g.)
(g) Globular zirconium silicate powder (100–600μ)—49% (650 g.)

The components (d) to (g) were uniformly mixed together, whereby the desired liquid unsaturated polyester resin composition was obtained. The thus obtained composition was cured at 80° C. for 2 hours and 150° C. for 5 hours, and the characteristics of the thus obtained cured product are given in Table 1.

EXAMPLE 24

(a) Phenol resin (molar ratio of formaldehyde to phenol: 0.9)—100 g.
(b) Hexamethylenetetramine—12.5 g.
(c) Magnesium oxide—1 g.
(d) Magnesium stearate—1 g.
(e) Irregularly-shaped beryl powder (not more than 50μ)—16% (90 g.)
(f) Globular beryl powder (70–200μ)—34% (200 g.)

The components were mixed thoroughly by a dry process, then kneaded in a mixing roll at 80° to 90° C. for 15 to 20 minutes, cooled and crushed to particle sizes of less than 6000μ, whereby the desired powdered phenol resin composition was obtained. The thus obtained composition was readily flowable at a temperature of 150 to 170° C., and could be readily molded under a pressure of 50 to 60 kg./cm.$^2$. The composition was cured at 150° C. for 7 hours and the characteristics of the thus obtained cured product are given in Table 1.

EXAMPLE 25

(a) Phenol-formaldehyde-novolac type epoxy resin—100 g.
(b) Diaminodiphenylmethane—23 g.
(c) Resorcinol—5 g.
(d) Stearic acid—2 g.
(e) Gloubular silica powder (not more than 60μ—16% (90 g.)
(f) Globular silica powder (90–250μ)—34% (200 g.)

The components (a) to (f) were uniformly mixed together by a dry process, then kneaded in a mixing roll at 40° to 50° C. for 5 minutes, cooled and crushed, whereby the desired powdered epoxy resin composition was obtained. The thus obtained composition was readily flowable at a molding temperature of 150° to 160° C. and could be cured rapidly even under such a very low molding pressure as 5 to 20 kg./cm.$^2$. The thus obtained composition was heated and cured at 150° C. for 5 hours, and the characteristics of the thus obtained cured product are shown in Table 1.

EXAMPLE 26

(a) Phenylmethylsiloxane resin—100 g.
(b) Calcium stearate—1 g.
(c) Carbon black—4 g.
(d) Ammonium acetate—1 g.
(e) Irregularly-shaped beryl powder (not more than 60μ)—15% (80 g.)
(f) Globular bery powder (80–250μ)—35% (190 g.)

The components (a) to (f) were thoroughly mixed together by a dry process, then kneaded in a mixing roll, whose front roll was heated to 80° to 90° C. and whose back roll was heated to 5° to 10° C., for 5 to 8 minutes, then cooled and crushed, whereby the desired powdered silicone resin composition was obtained. The thus obtained composition was readily flowable at a temperature of 170 to 185° C., and could be molded rapidly even under such a low pressure as 20 to 40 kg./cm.$^2$. The composition was heated to 200° C. for 3 hours, and the characteristics of the thus obtained cured product are given in Table 1.

EXAMPLE 27

(a) Vinylcyclohexene dioxide—100 g.
(b) MHAC—110 g.
(c) 2-ethyl-4-methylimidazole—3 g.
(d) Trilead tetroxide powder (not more than 40μ)—2.4% (200 g.)
(e) Globular zirconium silicate powder (not more than 50μ)—23% (1000 g.)
(f) Globular zirconium silicate powder (150–800μ)—55% (2400 g.)

The components (a) to (f) were thoroughly mixed together, whereby the desired liquid epoxy resin composition was obtained. The thus obtained composition was cured under the same conditions as in Example 17, and the characteristics of the thus obtained cured product are given in Table 1.

EXAMPLE 28

(a) The same unsaturated polyester resin as used in Example 23—100 g.
(b) Benzoyl peroxide—0.5 g.
(c) Carbon black—4 g.
(d) Tabular alumina powder (not more than $50\mu$)—19% (320 g.)
(e) Globular zirconium silicate powder ($100-600\mu$)—48% (650 g.)
(f) Lead dioxide powder (less than $40\mu$)—3.6% (100 g.)

The components (a) to (f) were thoroughly mixed together, whereby the desired liquid unsaturated polyester resin composition was obtained. The thus obtained composition was cured under the same conditions as in Example 23, and the characteristics of the thus obtained cured product are given in Table 1.

EXAMPLE 29

To the same components (a) to (f) as in Example 24 was added 4% (140 g.) of trilead tetroxide powder, whereby the desired powdered phenol resin composition was obtained after mixing. The flow property or moldability of the thus obtained composition was substantially equal to that obtained in Example 24, when melted. The thus obtained composition was cured under the same conditions as in Example 24, and the characteristics of the thus obtained cured product are given in Table 1.

EXAMPLE 30

To the same components (a) to (f) as in Example 25 was added 6% (200 g.) of lead monoxide powder, whereby the desired powdered epoxy resin composition was obtained after mixing. The flow property or moldability of the thus obtained composition was substantially equal to that obtained in Example 25, when melted. The thus obtained composition was cured under the same conditions as in Example 25, and the characteristics of the thus obtained cured product are given in Table 1.

The reference examples are given below:

Reference Example 1

(a) Vinylcyclohexene dioxide—50 g.
(b) Diglycidyl ether of bisphenol A—50 g.
(c) MHAC—120 g.
(d) Crystalline natural silica powder (not more than $50\mu$)—50% (500 g.)

The components (a) to (d) were thoroughly mixed together, whereby a liquid epoxy resin composition for the casting purpose was prepared. The viscosity of the thus prepared composition was more than 1000 poises (30° C.) and the casting operation was very hard to conduct. The thus obtained composition was cured at 120° C. for 2 hours and 150° C. for 19 hours, and the characteristics of the thus obtained cured product are given in Table 1.

Reference Example 2

(a) Epoxynovolac (ECN 1273 produced by Ciba, Ltd.)—100 g.
(b) 4,4'-Diaminodiphenylmethane—22 g.
(c) Catechol—5 g.
(d) Stearic acid—2 g.
(e) Carbon black—0.8 g.
(f) Crystalline natural silica powder (not more than $60\mu$)—60% (440 g.)

The components (a) to (f) were employed. First of all, the components (a) and (c) to (f) were kneaded in a mixing roll at 50° to 60° C. for 15 minutes, then cooled and crushed to particle sizes of more than $150\mu$. To the thus obtained powder was added the component (b), and the mixture was thoroughly mixed, and then once pressed under a pressure of 1500 kg./cm.$^2$ and crushed to particle sizes of less than $5000\mu$, whereby a powdered epoxy resin composition was prepared. The viscosity of the thus prepared composition, when melted (150° C.), was more than 1000 poises, and the transfer molding of the composition at a temperature of 150° required a pressure of 150 kg./cm.$^2$. The characteristics of the cured product are given in Table 1.

Reference Example 3

In place of the components (b) and (c) used in Example 20, 59% (650 g.) of crystalline $\alpha$-silica powder (not more than $40\mu$) was mixed with other components used in Example 20, and a powdered silicone resin composition was prepared in the same manner as in Example 20. The viscosity of the thus prepared composition, when melted (180° C.), was 950 poises, and the transfer molding at a temperature of 180° C. required such a high pressure as 150 to 250 kg./cm.$^2$. The thus prepared composition was cured under the same conditions as in Example 20, and the characteristics of the thus obtained cured product are given in Table 1.

Reference Example 4

In place of the components (f) and (g) used in Example 21, 60% (336 g.) of crystalline $\alpha$-silica powder (not more than $40\mu$) was added to other components used in Example 21, and mixed thoroughly together, whereby a liquid unsaturated polyester resin composition was prepared. The thus obtained composition was cured under the same conditions as in Example 21, and the characteristics of the thus obtained cured product are given in Table 1.

Reference Example 5

In place of the components (c) and (d) used in Example 22, 61% (395 g.) of crystalline $\alpha$-silica powder (not more than $60\mu$) was added to other components used in Example 22, and a powdered phenol resin composition was prepared in the same manner as in Example 22. The thus obtained composition was cured under the same conditions as in Example 22, and the characteristics of the thus obtained cured product are given in Table 1.

TABLE 1

| Test piece | Flow property (viscosity: poises) | Coefficient of linear thermal expansion at 20-160° C. (° C.$^{-1}$) | Heat distortion (° C.) | Volume resistivity ($\Omega$-cm.) | Thermal conductivity (20-50° C.) (cal./cm.sec.° C.) |
|---|---|---|---|---|---|
| Example: | | | | | |
| 1 | 500 | $2.5 \times 10^{-5}$ | 140 | $6 \times 10^9$ | |
| 2 | 600 | $1.8 \times 10^{-5}$ | 150 | $5 \times 10^8$ | |
| 3 | 200 | $1.9 \times 10^{-5}$ | 155 | $6 \times 10^6$ | |
| 4 | 250 | $1.4 \times 10^{-5}$ | 160 | $7 \times 10^8$ | |
| 5 | 550 | $1.5 \times 10^{-5}$ | 145 | $4 \times 10^7$ | |
| 6 | 550 | $2.5 \times 10^{-5}$ | 160 | $3 \times 10^{13}$ | |
| 7 | *400 | $1.9 \times 10^{-5}$ | 159 | $2 \times 10^{14}$ | $25 \times 10^{-4}$ |
| 8 | 150 | $1.8 \times 10^{-5}$ | 170 | $5 \times 10^{12}$ | |
| 9 | 110 | $1.3 \times 10^{-5}$ | 185 | $2 \times 10^{12}$ | |

TABLE 1—Continued

| Test piece | Flow property (viscosity: poises) | Coefficient of linear thermal expansion at 20-160° C. (° C.$^{-1}$) | Heat distortion (° C.) | Volume resistivity (Ω-cm.) | Thermal conductivity (20-50° C.) (cal./cm.sec.° C.) |
|---|---|---|---|---|---|
| 10 | 90 | 0.7×10$^{-5}$ | 195 | 2×10$^{13}$ | |
| 11 | *200 | 1.4×10$^{-5}$ | 185 | 3×10$^{13}$ | |
| 12 | *350 | 1.5×10$^{-5}$ | 165 | 9×10$^{10}$ | |
| 13 | 270 | 1.4×10$^{-5}$ | 156 | 4×10$^{12}$ | |
| 14 | 500 | 1.6×10$^{-5}$ | 150 | 3×10$^{8}$ | 50×10$^{-4}$ |
| 15 | 70 | 2.1×10$^{-5}$ | 152 | 3×10$^{9}$ | |
| 16 | 190 | 1.3×10$^{-5}$ | 153 | 4×10$^{8}$ | 30×10$^{-4}$ |
| 17 | 200 | 0.8×10$^{-5}$ | 153 | 6×10$^{8}$ | 27×10$^{-4}$ |
| 18 | 90 | 0.9×10$^{-5}$ | 162 | 9×10$^{7}$ | |
| 19 | *170 | 1.8×10$^{-5}$ | 155 | 4×10$^{8}$ | |
| 20 | *350 | 2.6×10$^{-5}$ | 270 | 4×10$^{14}$ | |
| 21 | 230 | 1.5×10$^{-5}$ | 135 | 8×10$^{6}$ | |
| 22 | *370 | 1.6×10$^{-5}$ | 150 | 9×10$^{6}$ | |
| 23 | 300 | 1.4×10$^{-5}$ | 135 | 5×10$^{7}$ | |
| 24 | *200 | 2.3×10$^{-5}$ | 165 | 6×10$^{6}$ | |
| 25 | *100 | 3.0×10$^{-5}$ | 155 | 4×10$^{8}$ | |
| 26 | *250 | 3.2×10$^{-5}$ | 270 | 8×10$^{13}$ | |
| 27 | 250 | 0.8×10$^{-5}$ | 190 | 2×10$^{13}$ | |
| 28 | 210 | 1.3×10$^{-5}$ | 165 | 4×10$^{12}$ | |
| 29 | *300 | 2.2×10$^{-5}$ | 180 | 6×10$^{11}$ | |
| 30 | *200 | 2.9×10$^{-5}$ | 180 | 3×10$^{13}$ | |
| Ref. Ex.: | | | | | |
| 1 | 1,000 | 3.3×10$^{-5}$ | 153 | 6×10$^{7}$ | |
| 2 | *9,500 | 3.0×10$^{-5}$ | 155 | 5×10$^{7}$ | |
| 3 | *8,000 | 3.5×10$^{-5}$ | 270 | 4×10$^{14}$ | |
| 4 | 5,000 | 2.9×10$^{-5}$ | 133 | 9×10$^{6}$ | |
| 5 | *11,000 | 2.8×10$^{-5}$ | 151 | 7×10$^{6}$ | |

In the above table, the flow property was determined by a viscosity of the thermosetting resin composition at 30° C. and those marked by "*" show the melt viscosities at 150° C. The coefficient of linear thermal expansion was determined according to ASTM-D696-44. The heat distortion temperature was determined according to ASTM-D648-45T. The moisture resistance was evaluated by a volume resistivity of the cured product after having been dipped in boiling water for 100 hours. The thermal conductivity was determined only for selected products having relatively good conductivities according to ASTM-C177-45.

As is clear from the results shown in Table 1, the thermosetting resin compositions of the present invention have a good flow property, irrespective of the liquid or powdered compositions, and are very advantageous from the view point of molding, coating or impregnating operation, which is evident from the fact that the viscosity at room temperature is low in the case of the liquid resin composition and the viscosity when melted is low in the case of the powdered resin composition. It is needless to mention the excellent physical properties of the cured resin composition of the present invention.

When the thermosetting resin composition of the present invention is applied to an electrical appliance as a molding resin, the heat cycle characteristics of the electrical appliance is considerably improved and the life of the appliance can be thereby prolonged. This fact will be explained in detail hereunder, referring to examples.

EXAMPLE 31

(a) Bisphenol A type epoxy resin—100 g.
(b) Dipentene dioxide—100 g.
(c) MHAC—120 g.
(d) Benzyldimethylamine—3 g.
(e) Globular α - alumina powder (150–300μ)—28% (510 g.)
(f) Globular α-alumina powder (not more than 50μ)—12% (220 g.)

The components (a) to (f) were thoroughly mixed together, whereby the desired liquid epoxy resin composition was obtained. A semi-conductor element having a structure as shown in FIG. 1 was molded with the thus prepared composition, and the semi-conductor device as shown in FIG. 1 was prepared. The composition was heated and cured at 120° C. for 2 hours, 150° C. for 2 hours and 180° C. for 3 hours. The coefficient of linear thermal expansion of the obtained cured product was 3.3×10$^{-5}$/° C. The result of heat cycle test of the thus obtained semi-conductor device as shown in Table 2.

EXAMPLE 32

(a) Bisphenol A type epoxy resin—100 g.
(b) Dipentene dioxide—100 g.
(c) MHAC—120 g.
(d) DMP-30—3 g.
(e) Globular α - alumina powder (150–300μ)—28% 31% (740 g.)
(f) Globular zirconium silicate powder (not more than 60μ)—14% (320 g.)
(g) Carbon black—5 g.

The components (a) to (g) were thoroughly mixed together whereby the desired liquid epoxy resin composition was obtained. A semi-conductor device was prepared in the same manner as in Example 31, using the thus prepared composition. The coefficient of linear thermal expansion of the thus obtained cured product was 2.9×10$^{-5}$/° C. The result of heat cycle test of the thus prepared semi-conductor device are given in Table 2.

EXAMPLE 33

(a) Bisphenol A type epoxy resin—50 g.
(b) Dipentene dioxide—100 g.
(c) MHAC—110 g.
(d) DMP-30—3 g.
(e) Globular zirconium silicate powder (200–400μ)—35% (770 g.)
(f) Globular zirconium silicate powder (now more than 50μ)—15% (330 g.)
(g) Lead tetroxide powder (less than 40μ)—5% (200 g.)

The components (a) to (g) were thoroughly mixed together, whereby the desired liquid epoxy resin composition was obtained. A semi-conductor device was prepared in the same manner as in Example 31 using the thus prepared composition. The coefficient of linear thermal expansion of the obtained cured product was 2.3×10$^{-5}$/° C. The results of heat cycle test of the thus prepared semi-conductor device are given in Table 2.

Reference Example 6

(a) Phenol-formaldehyde-novolac type epoxy resin—100 g.
(b) Vinylcyclohexene dioxide—50 g.
(c) MHAC—150 g.
(d) DMP-30—3 g.

(e) Tubular α-alumina powder (not more than 50μ)— 31% (450 g.)
(f) Carbon black—3 g.

The components (a) to (f) were thoroughly mixed together, whereby a liquid epoxy resin composition was obtained. A semi-conductor device was prepared in the same manner as in Example 31 using the thus prepared composition. The coefficient of linear thermal expansion of the obtained cured product was $3.9 \times 10^{-5}/°$ C. The result of heat cycle test of the thus prepared semi-conductor device are shown in Table 2.

TABLE 2

| Test piece | Thermal shock resistivity test (failure rate of lead breakage) (percent) | | Moisture resistance test (failure in $I_{CBO}$) percent | |
|---|---|---|---|---|
| | After 200 cycles | After 400 cycles | After 20 cycles | After 40 cycles |
| Example: | | | | |
| 31 | 10 | 30 | 2 | 7 |
| 32 | 0 | 0 | 0 | 0 |
| 33 | 0 | 0 | 0 | 0 |
| Reference Example 6 | 60 | 80 | 10 | 40 |

(In Table 2, the thermal shock resistivity test is based on a heat cycle test where one cycle consists of a retention of a test piece at 180° C. for 1 minute and successive retention thereof at −198° C. for 1 minute. The moisture resistance test is based on a heat cycle test where one cycle consists of a retention of a test piece in water at 120° C. under two atmospheres for 15 minutes and successive retention in water at room temperature under one atmosphere for 15 minutes.)

EXAMPLE 34

(a) Phenylmethylsiloxane resin—200 g.
(b) Stearic acid—2 g.
(e) Molten quartz powder (not more than 60μ)—18%
(d) Molten quartz powder (130–280μ)—39% (420 g.)
(e) Molten quartz powder (not more than 60μ)— 18% (200 g.)
(f) Carbon black—1 g.

The components (a) to (f) were uniformly kneaded in a mixing roll, whose back roll was water-cooled and whose front roll was heated to 70° to 80° C., whereby the desired powdered silicon resin composition was obtained after pulverization. A semi-conductor element having a structure as shown in FIG. 1 was transfer-molded at 175° C. under a pressure of 75 kg./cm.² for 5 minutes using the thus obtained composition and after-cured at 200° C. for 3 hours, whereby the desired semi-conductor device was prepared. The coefficient of linear thermal expansion of the thus obtained cured product had $2.5 \times 10^{-5}/°$ C. The results of heat cycle test of the thus obtained semi-conductor device are shown in Table 3.

EXAMPLE 35

(a) Phenylmethylsiloxane resin—200 g.
(b) Zinc stearate—2 g.
(c) Ammonium stearate—2 g.
(d) Molten quartz powder (150–400μ)—38% (500 g)
(e) Molten quartz powder (not more than 50μ)—27% (350 g.)
(e) Carbon black—1 g.

The components (a) to (f) were uniformly mixed together in the same manner as in Example 34, whereby the desired powdered silicon resin composition was obtained. The desired semi-conductor device was prepared by transfer-molding and after-curing of the thus prepared composition in the same manner as in Example 34. The coefficient of linear thermal expansion of thus obtained cured product was $1.8 \times 10^{-5}/°$ C. The heat cycle characteristics of the thus prepared semi-conductor device are shown in Table 3.

EXAMPLE 36

(a) Phenylmethylsiloxane resin—200 g.
(b) Stearic acid—2 g.
(c) Ammonium stearate—2 g.
(d) Molten quartz powder (200–400μ)—51% (860 g.)
(e) Molten quartz powder (not more than 60μ)—22% (370 g.)
(e) Carbon black—1 g.

The components (a) to (f) were uniformly mixed together in the same manner as in Example 34, whereby the desired powdered silicone resin composition was obtained. The desired semi-conductor device was prepared by transfer-molding and after-curing of the thus prepared composition in the same manner as in Example 34. The coefficient of linear thermal expansion of the thus obtained cured product was $1.3 \times 10^{-5}/°$ C. The results of heat cycle test of the thus obtained semi-conductor device are shown in Table 3.

Reference Example 7

(a) Phenylmethylsiloxane resin—200 g.
(b) Calcium stearate—2 g.
(c) Ammonium stearate—2 g.
(d) Quartz powder (not more than 50μ)—57% (620 g.)
(e) Carbon black—1 g.

The components (a) to (e) were evenly kneaded in the same manner as in Example 34, whereby a solid silicone resin composition was prepared. A semi-conductor device was prepared by transfer-molding and after-curing of the thus obtained composition in the same manner as in Example 34. The coefficient of linear thermal expansion was $3.8 \times 10^{-5}/°$ C. The result of heat cycle test of the thus obtained semi-conductor device are shown in Table 3.

TABLE 3

| Test piece | Thermal shock resistivity test (crack occurrence) (percent) | | Items Moisture resistance test (failure in VCBO) (percent) |
|---|---|---|---|
| | Resin crack | Element crack | |
| Example: | | | |
| 34 | 10 | 16 | 28 |
| 35 | 0 | 0 | 0 |
| 36 | 0 | 0 | 0 |
| Reference Example 7 | 100 | 20 | 80 |

(In Table 3, the thermal shock resistivity test is based on a 10-heat cycle test where one cycle consists of a retention of a test piece at 150° C. for 15 minutes and successive retention thereof at −55° C. for 15 minutes. The moisture resistance test is based on a 20-heat cycle test where one cycle consists of a retention of a test piece in water at 120° C. under 2 atmospheres and successive retention thereof in water at room temperature for 15 minutes.)

EXAMPLE 37

A heating wire 10 consisting of a spiral nichrome wire was inserted into a heater protection pipe 9 consisting of a stainless pipe having an inner diameter of 10 mm. and wall thickness of 1 mm., and inorganic powder consisting of magnesium oxide powders having particle sizes of 10 to 300μ was packed therein for electrical insulation, whereby a sheath heater was prepared. The ends of the sheath heater were cast with a molding resin 13 in the following manner:

(a) DER–332—100 g.
(b) Vinylcyclohexene dioxide—100 g.
(c) Methylnadic anhydride (a product produced by Allied Chemical Corporation)—187 g.
(d) DMP–30—3 g.

The epoxy resin composition consisting of said components (a) to (d) was applied in advance to the end parts of inorganic powder-packed layer 12 for sealing. The amount of the composition impregnated for sealing was 0.1 g. After impregnation, the impregnated resin composition was heated to a temperature of 130 to 170° C. for 5 minutes and half-cured. Then, the following components (e) to (j) were uniformly mixed, whereby the desired liquid epoxy resin composition was obtained.

(e) Vinylcyclohexene dioxide—100 g.
(f) Tetrahydrophthalic anhydride—100 g.
(g) 2-ethyl-4-methylimidazole—3 g.
(h) Lead tetroxide powders (not more than 10μ)—4% (300 g.)
(i) Zirconium silicate powders (not more than 50μ)—20% (600 g.)
(j) Zirconium silicate powders (50–500μ)—48% (1500 g.)

The thus obtained composition was cast to the end parts of said sealed layer. After casting, said sealed layer and cast resin layer were cured at 60° C. for 5 hours, 80° C. for 5 hours and 150° C. for 10 hours, whereby the desired sheath heater was obtained. The coefficient of linear thermal expansion of the obtained cured product was $1.3 \times 10^{-5}$/° C. The characteristics of thus obtained sheath heater were determined by change in insulation resistance, and the results are shown in Table 4.

EXAMPLE 38

(a) DER-332—100 g.
(b) Glycidyl ether of cardanol—200 g.
(c) Dodecenylsuccinic anhydride—260 g.
(d) DMP-30—3 g.

The end parts of the inorganic powder-packed layer were sealed in the same manner as in Example 37, using said components (a) to (d).

(e) Dipentene dioxide—100 g.
(f) Tetrahydrophthalic anhydride—100 g.
(g) 2-ethyl-4-methylimidazole—3 g.
(h) Lead dioxide powder (not more than 10μ)—4% (200 g.)
(i) Alumina powder (not more than 30μ)—20% (500 g.)
(j) Alumina powder (60–600μ)—48% (1100 g.)
(k) Carbon black—2 g.

The end parts of said sealed layer were cast with the composition comprising said components (e) to (k) in the same manner as in Example 37, and cured, whereby the desired sheath heater was obtained. The coefficient of linear thermal expansion of the obtained cured product was $1.4 \times 10^{-5}$/° C. The characteristics of the thus obtained sheath heater were determined in the same manner as in Example 37, and the results are shown in Table 4.

TABLE 4
Insulation Resistance (MΩ) (initial value)

| Items | Test piece | |
|---|---|---|
| | Example 37 | Example 38 |
| After dipping in boiling water for 100 hours | ∞ | ∞ |
| After heating by passing current for 30 minutes after dipping in boiling water for 5 hours | 30 | 40 |
| After 10 heat cycles* | ∞ | ∞ |
| After 10 service heat cycles** | ∞ | ∞ |
| After allowing to stand at 70° C. and 95% RH for 100 hours | ∞ | ∞ |

(In Table 4, the mark "*" indicates that one cycle consists of a retention of a test piece in boiling water for 15 minutes and successive retention thereof at −50° C. for 15 minutes. The mark "**" indicates that one cycle consists of a retention of a test piece heated by passing current for 30 minutes and successive retention thereof at −10° C. for 15 minutes).

The following preferable fact is evident from said Examples 31 to 38 and Reference Example 7. That is, when a difference between the coefficient of thermal expansion of the cured product and that of element material used in the electrical appliance is within a specific range, damage occurrence of element and crack occurrence of molded resin (cured resin) are very low, even if there is an influence due to the heat cycle. That is, when a difference between the coefficient of thermal expansion of the cured product and that of element material of the electric appliance is within $1.5 \times 10^{-5}$/° C., said favorable results can be expected.

We claim:

1. A thermosetting resin composition for use in an electrical insulation having good casting characteristics and capable of producing a cured casting product with a coefficient of linear thermal expansion smaller than $3 \times 10^{-5}$ per degree C., which comprises a liquid thermosetting resin with a viscosity smaller than 20 poises at about room temperature selected from the group consisting essentially of an epoxy resin and unsaturated polyester resin, and a powdered inorganic filler selected from the group consisting essentially of an alumina powder, beryllia powder, beryllium aluminum silicate powder, lithium aluminum silicate, amorphous silica powder, zirconia powder, zirconium silicate powder, ilmenite powder, magnesium aluminum silicate powder and combinations thereof in an amount of 40 to 80 percent by volume of the total volume of the composition, said filler consisting essentially of a coarse powder having a particle size of from 100 to 850 microns and a fine powder having a particle size smaller than 60 microns, the volume ratio of said fine powder to said coarse powder being 0.07 to 1.5, said composition being free from such substances as harmful to the electrical properties of said cured casting product and having a viscosity smaller than 600 poises at about room temperature.

2. A thermosetting resin composition according to claim 1, wherein the powered inorganic fillers are at least one member selected from the group consisting of zirconium silicate powders, amorphous silica powders, beryllium aluminum silicate powders, ilmenite powders, beryllia powders, alumina powders, barium sulfate powders and calcium carbonate powders.

3. A thermosetting resin composition according to claim 1, wherein the powdered inorganic fillers mainly comprise coarse zirconium silicate powders having particle sizes of not less than 100μ and globular shapes, and fine powders having particle sizes of not more than 60μ, the powdered inorganic fillers being mixed in a mixing ratio of 40 to 95% by volume per total volume.

4. A thermosetting resin composition according to claim 1, in which said coarse powder has a particle size ranging from 150 to 500 microns and said fine powder has a particle size smaller than 45 microns.

5. A thermosetting resin composition according to claim 4, wherein the powdered inorganic fillers are at least one member selected from the group consisting of zirconium silicate powders, amorphous silica powders, beryllium aluminum silicate powders, ilmenite powders, beryllia powders, alumina powders, barium sulfate powders and calcium carbonate powders.

6. A thermosetting resin composition according to claim 4, wherein the powdered inorganic fillers mainly comprise coarse zirconium silicate powders having particle sizes of not less than 100μ and globular shapes, and fine powders having particle sizes of not more than 60μ, the powdered inorganic fillers being mixed in a mixing ratio of 40 to 95% by volume per total volume.

7. A thermosetting resin composition according to claim 4, wherein the powdered inorganic fillers mainly comprise zirconium silicate powders, most of which has globular shapes, in a mixing ratio of 40 to 95% by volume per total volume.

8. A thermosetting resin composition according to claim 1, in which particles of at least said coarse powder have a globular shape whereby a decrease in flow property of said composition will be minimized.

9. A thermosetting resin composition according to claim 8, wherein the powdered inorganic fillers mainly comprise zirconium silicate powders, most of which has globular shapes.

10. A thermosetting resin composition according to claim 9, wherein lead oxide powders are further contained.

11. A thermosetting resin composition according to claim 10, wherein a mixing ratio of the lead oxide powders is 1 to 30% by volume per total volume.

12. A thermosetting resin composition according to claim 10, wherein mixing ratio of lead oxide powders is 1 to 30% by volume per total volume.

13. A thermosetting resin composition according to claim 9, wherein the lead oxide powders have particle sizes of less than $50\mu$.

14. A thermosetting resin composition for use in an electrical insulation having good molding characteristics and capable of producing a cured molding product with a coefficient of linear thermal expansion smaller than $3\times10^{-5}$ per degree C., which comprises a solid thermosetting resin selected from the group consisting essentially of an epoxy resin, phenol resin and silicone resin, and a powdered inorganic filler selected from the group consisting essentially of an alumina powder, beryllia powder, beryllium aluminum silicate powder, lithium aluminum silicate powder, amorphous silica powder, zirconia powder, zirconium silicate powder, ilmenite powder, magnesium aluminum silicate powder and combinations thereof in an amount of 40 to 80 percent by volume of the total volume of said composition, said filler consisting essentially of a coarse powder having a particle size of from 100 to 850 microns and a fine powder having a particle size smaller than 60 microns the volume ratio of said fine powder to said coarse powder being 0.07 to 1.5, said composition being free from such substance as harmful to the electrical properties of said cured molding product and having a viscosity smaller than 400 poises when melted at 150 degrees C.

15. A thermosetting resin composition for use in casting having an excellent flow property at about room temperature and also having a small thixotropy which comprises a liquid thermosetting resin having a viscosity smaller than 20 poises at about room temperature selected from the group consisting essentially of an epoxy resin and unsaturated polyester resin, and a powdered inorganic filler with a coefficient of lineal thermal expansion smaller than $1.5\times10^{-5}$ per degree C. in an amount of 40 to 95 percent by volume of the total volume of said composition, said filler consisting essentialy of a globular coarse powder having a particle size of from 100 to 850 microns and a fine powder having a particle size smaller than 60 microns, the volume ratio of said fine powder to said coarse powder being 0.07 to 1.5, thereby to produce a cured casting product with a coefficient of linear thermal expansion smaller than $3\times10^{-5}$ per degree C.

16. A thermosetting resin composition according to claim 15, wherein the thermosetting resin is an epoxy resin having a viscosity of not more than 20 poises at about room temperature.

17. A thermosetting resin composition according to claim 15, wherein 1 to 7% by volume of the lead oxide powders is contained, whereby the composition has a good flow property.

18. A thermosetting resin composition according to claim 15, wherein the lead oxide powders have particle sizes of not more than $50\mu$.

19. A thermosetting resin composition according to claim 15, in which said coarse powder has a particle size ranging from 150 to 500 microns and said fine powder has a particle size smaller than 45 microns.

20. A thermosetting resin composition according to claim 19, wherein the powdered inorganic fillers are at least one member selected from the group consisting of zirconium silicate powders, amorphous silica powders, beryllium aluminum silicate powders, ilmenite powders, beryllia powders, alumina powders, barium sulfate powders and calcium carbonate powders.

21. A thermosetting resin composition according to claim 19, wherein the powered inorganic fillers mainly comprise zirconium silicate powders, most of which has globular shapes.

22. A thermosetting resin composition according to claim 15, in which said filler is contained in an amount of 40 to 80 percent by volume of the total volume.

23. A thermosetting resin composition according to claim 22, wherein the thermosetting resin is an epoxy resin having a viscosity of not more than 20 poises at about room temperature.

24. A thermosetting resin composition according to claim 22, wherein the powdered inorganic fillers are at least one member selected from the group consisting of zirconium silicate powders, amorphous silica powders, beryllium aluminum silicate powders, ilmenite powders, berillia powders, aluminum powders, barium sulfate powders and calcium carbonate powders.

25. A thermosetting resin composition according to claim 22, wherein the powdered inorganic fillers mainly comprise zirconium silicate powders, most of which has globular shapes.

26. A thermosetting resin composition for use in molding having an excellent molding property and also having a good flow property when melted which comprises a solid thermosetting resin selected from the group consisting essentially of an epoxy resin, phenol resin and silicone resin, and a powdered inorganic filler with a coefficient of linear thermal expansion smaller than $1.5\times10^{-5}$ per degree C. in an amount of 40 to 95 percent by volume of the total volume of said composition, said filler consisting essentially of a coarse powder having a particle size of from 100 to 850 microns and a fine powder having a particle size smaller than 60 microns, the volume ratio of said fine powder to said coarse powder being 0.07 to 1.5 thereby to produce a cured molding product with a coefficient of linear thermal expansion smaller than $3\times10^{-5}$ per degree C.

27. A thermosetting resin composition according to claim 26, in which said filler is contained in an amount of 40 to 80 percent by volume of the total volume.

28. A thermosetting resin composition having an excellent flow property and capable of producing a cured product with a coefficient of linear thermal expansion smaller than $3\times10^{-5}$ per degree C., which comprises a thermosetting resin selected from the group consisting essentially of an epoxy resin, unsaturated polyester resin, phenol resin and silicone resin; a powdered inorganic filler with a coefficient of linear thermal expansion smaller than $1.5\times10^{-5}$ per degree C. in an amount of 40 to 95 percent by volume of the total volume of said composition, said filler consisting essentially of a coarse powder having a particle size of from 100 to 850 microns and a fine powder having a particle size smaller than 60 microns, the volume ratio of said fine powder to said coarse powder being 0.07 to 1.5; and a lead oxide powder having a particle size smaller than 50 microns in an amount of 1 to 30 percent by volume of the total volume of said composition, in which said lead oxide powder serves as an agent for suppressing the filler from precipitation when said composition is in a liquid state, whereby said composition exhibits said good flow property.

29. A thermosetting resin composition according to claim 28, in which particles of at least said coarse powder have a globular shape whereby a decrease in flow property of said composition will be maintained.

30. A cured casting product with a coefficient of linear thermal expansion smaller than $3 \times 10^{-5}$ per degree C. which is a hardened product of a thermosetting resin composition comprising a thermosetting resin having a viscosity smaller than 20 poises at about room temperature selected from the group consisting essentially of an epoxy resin and unsaturated polyester resin, and a powdered inorganic filler with a coefficient of linear thermal expansion smaller than $1.5 \times 10^{-5}$ per degree C. in an amount of 40 to 95 percent by volume of the total volume of said composition, said filler consisting essentially of a coarse powder having a particle size of from 100 to 850 microns and a fine powder having a particle size smaller than 60 microns, the volume ratio of said fine powder to said coarse powder being 0.07 to 1.5.

31. A cured molding product with a coefficient of linear thermal expansion smaller than $3 \times 10^{-5}$ per degree C. which is a hardened molding product of a thermosetting resin composition comprising a solid thermosetting resin selected from the group consisting essentially of an epoxy resin, phenol resin and silicone resin, and a powdered inorganic filler with a coefficient of linear thermal expansion smaller than $1.5 \times 10^{-5}$ per degree C. in an amount of 40 to 95 percent by volume of the total volume of said composition, said filler consisting essentially of a coarse powder having a particle size of from 100 to 850 microns and a fine powder having a particle size smaller than 60 microns, the volume ratio of said fine powder to said coarse powder being 0.07 to 1.5.

32. A cured product with a coefficient of linear thermal expansion smaller than $3 \times 10^{-5}$ per degree C., an increased thermal conductivity, excellent mechanical and electrical properties and improved water and chemicals resistance, which is a hardened product of a thermosetting resin composition comprising a thermosetting resin, a powdered inorganic filler with a coefficient of linear thermal expansion smaller than $1.5 \times 10^{-5}$ per degree C. in an amount of 40 to 95 percent by volume of the total volume of said composition, said filler consisting essentially of a coarse powder having a particle size of from 100 to 850 microns and a fine powder having a particle size smaller than 60 microns, the volume ratio of said fine powder to said coarse powder being 0.07 to 1.5; and a lead oxide powder having a particle size smaller than 50 microns in an amount of 1 to 30 percent by volume of total volume of said composition.

33. A thermosetting resin composition having an improved flow characteristic under a liquid state thereof and capable of producing a cured product with a coefficient of linear thermal expansion smaller than $3 \times 10^{-5}$ per degree C., which comprises a thermosetting resin; a powdered inorganic filler with a coefficient of linear thermal expansion smaller than $1.5 \times 10^{-5}$ per degree C. in an amount of 40 to 80 percent by volume of the total volume of said composition, said filler consisting essentially of a coarse powder selected from the group consisting essentially of a zirconium silicate powder, amorphous silica powder, beryllium aluminum silicate powder, ilmenite powder, beryllia powder, barium sulfate powder, calcium carbonate powder and combinations thereof and having a particle size of from 150 to 500 microns and a fine powder having a particle size smaller than 45 microns, the volume ratio of said fine powder to said coarse powder being 0.07 to 1.5; and a lead oxide powder having a particle size smaller than 50 microns in an amount of 1 to 7 percent by volume of the total volume of said composition, said composition having a small thixotropy and a viscosity smaller than 600 poises at about room temperature in the case of a used liquid thermosetting resin which has a viscosity smaller than 20 poises at about room temperature, but having a viscosity smaller than 400 poises when melted at 150 degrees C. in the case of a solid thermosetting resin used, in which said lead oxide powder serves as an agent for suppressing said filler from precipitation.

34. A cured product having a coefficient of linear thermal expansion smaller than $3 \times 10^{-5}$ per degree C., an increased thermal conductivity, excellent mechanical and electrical properties and improved water and chemicals resistances, which is a hardened product of a thermosetting resin composition comprising a thermosetting resin, a powdered inorganic filler with a coefficient of linear thermal expansion smaller than $1.5 \times 10^{-5}$ per degree C. in an amount of 40 to 80 percent by volume of the total volume of said composition, said filler consisting essentially of a coarse powder selected from the group consisting essentially of a zirconium silicate powder, amorphous silica powder, beryllium aluminum silicate powder, ilmenite powder, beryllia powder, barium sulfate powder, calcium carbonate powder and combinations thereof and having a particle size of from 150 to 500 microns, and a fine powder having a particle size smaller than 45 microns, the volume ratio of said fine powder to said coarse powder being 0.07 to 1.5; and a lead oxide powder, which serves as an agent for suppressing said filler from precipitation, and has a particle size smaller than 50 microns in an amount of 1 to 7 percent by volume of the total volume of said composition.

References Cited

UNITED STATES PATENTS 3,360,391   12/1967   Richtzenhain et al.
260—37 Ep X

LEWIS T. JACOBS, Primary Examiner

U.S. Cl. X.R.

260—37 Ep, 37 SB, 39 R, 40 R